United States Patent Office 2,823,110
Patented Feb. 11, 1958

2,823,110

METHOD OF PRODUCING METALLIC ZINC

William H. Schechter, Zelienople, Pa., assignor, by mesne assignments, to Callery Chemical Company, Pittsburgh, Pa., a corporation of Pennsylvania No Drawing. Application September 19, 1955
Serial No. 535,281

11 Claims. (Cl. 75—86)

This invention relates to the production of zinc and more particularly it relates to a new and improved method for producing zinc by the reduction of sodium zincate, $Na_2ZnO_2$, with hydrogen or water gas.

Zinc has been produced in the past by a variety of methods. In one method, a low grade zinc ore is treated with sodium carbonate to remove gangue and earthy substances. The condensation product containing zinc oxide is treated again with a fresh charge of sodium carbonate and carbon and zinc distilled therefrom and condensed. In another method, zinc ore is heated by a reducing flame with a mixture of carbon, lime and an alkali metal salt to form nascent alkali metal which reduces the ore to metallic zinc. In a third method, zinc oxide is reduced with hydrogen, methane or ethane at a suitable temperature to form zinc and water. However, this process is of no practical value since the reaction is reversible and the reduced zinc is reoxidized by the liberated water vapor as quickly as such reduced zinc is formed. In still another method, zinc oxide is reduced with hydrogen in the presence of a ternary mixture of sodium, potassium and calcium chlorides containing calcium oxide. The calcium oxide reacts with the water formed and prevents a reversal of the reaction. United States Patent 2,655,472 describes the use of a caustic leaching solution on a complex zinc ore resulting in the formation of a substantially pure zincate from which zinc is produced by electrolysis. Other United States patents disclose the use of caustic soda or sodium carbonate for treating zinc ore. However, the method described in the present invention is not disclosed in any of the prior art references.

It is an object of this invention to provide a rapid and efficient method for producing metallic zinc.

Another object is to provide a new and useful method for the production of zinc by heating zinc oxide with an alkali metal carbonate or hydroxide such as sodium carbonate or sodium hydroxide to form an alkali metal zincate such as sodium zincate which is reduced with hydrogen or water gas at a temperature sufficient to distill zinc from the reaction zone.

Other objects will manifest themselves throughout the specification and appended claims.

This new and improved method for producing metallic zinc will be more fully described hereinafter and the novelty thereof will be particularly pointed out and distinctly claimed.

This invention is based upon the discovery that when zinc oxide and an alkali metal carbonate or hydroxide such as sodium carbonate or sodium hydroxide are heated an alkali metal zincate such as sodium zincate is formed according to the following chemical equations:

$$ZnO + Na_2CO_3 \xrightarrow{\text{Heat}} Na_2ZnO_2 + CO_2$$

$$ZnO + 2NaOH \xrightarrow{\text{Heat}} Na_2ZnO_2 + H_2O$$

The zincate is then reduced with hydrogen or water gas and the zinc vapors are condensed as follows:

$$Na_2ZnO_2 + H_2 \xrightarrow{\text{Heat}} 2NaOH + Zn$$

$$Na_2ZnO_2 + CO \xrightarrow{\text{Heat}} Na_2CO_3 + Zn$$

The sodium hydroxide and sodium carbonate thus formed are recycled with more zinc oxide and the process repeated. A similar reaction takes place with the other carbonates and hydroxides of the alkali metals. As can readily be seen, the outstanding feature of this invention is that no water is formed which will react with the zinc to produce zinc oxide.

In one embodiment of this invention a sample of sodium zincate, $Na_2ZnO_2$, was heated in a suitable combustion tube for one hour at 900° C. A continuous flow of hydrogen was maintained through the tube. A gray, water-insoluble metallic deposit condensed in the downstream end of the tube and was identified as pure metallic zinc. The reaction residue was sodium hydroxide contaminated with a small amount of unreacted sodium zincate. Thus, the reduction of the sodium zincate with hydrogen resulted in the formation of zinc and sodium hydroxide in substantially quantitative yield. The sodium hydroxide by-product may be recycled for further reaction with zinc oxide to prepare sodium zincate.

In another experiment carbon monoxide was used in place of hydrogen as the reducing agent. The sodium zincate was reduced to metallic zinc and sodium carbonate. The sodium carbonate thus formed was recycled for reaction with more zinc oxide and the process continued.

Water gas will reduce sodium zincate in a similar manner to produce zinc and a by-product mixture of sodium hydroxide and sodium carbonate. The by-product mixture may be further reacted with zinc oxide to produce sodium zincate.

Having thus described this invention, it will be apparent to those skilled in the art that other modifications are possible. It should therefore be understood that within the scope of the appended claims, this invention may be practiced otherwise than as specifically described.

What I desire to claim and secure by United States patent is:

1. A method for producing metallic zinc which comprises heating a mixture of zinc oxide and an alkali metal salt selected from the class consisting of alkali metal carbonates, alkali metal hydroxides, and mixtures thereof, to produce an alkali metal zincate, then reducing said alkali metal zincate with a gas selected from the class consisting of hydrogen, carbon monoxide, and mixtures thereof, at a temperature sufficient to distill zinc vapors from the reaction zone, condensing said vapors and recycling the by-product alkali metal salt for further reaction with zinc oxide.

2. A method according to claim 1 in which the alkali metal salt is the sodium salt.

3. A method according to claim 2 in which the sodium zincate is heated at a temperature of about 900° C.

4. A method according to claim 3 in which the sodium salt is sodium carbonate.

5. A method according to claim 3 in which the sodium salt is sodium hydroxide.

6. A method according to claim 3 in which the reducing gas is hydrogen.

7. A method according to claim 3 in which the reducing gas is carbon monoxide.

8. A method of preparing metallic zinc which comprises reducing an alkali metal zincate with a gas selected from the class consisting of hydrogen, carbon monoxide and mixtures thereof at a temperature sufficient to distill zinc vapor from the reaction zone, condensing said vapors and recycling the by-product alkali metal salt for further reaction with zinc oxide.

9. A method according to claim 8 in which the alkali metal zincate is sodium zincate.

10. A method according to claim 9 in which the reducing gas is hydrogen.

11. A method according to claim 9 in which the reducing gas is carbon monoxide.

References Cited in the file of this patent

UNITED STATES PATENTS

| | | |
|---|---|---|
| 702,764 | Babe | June 17, 1902 |
| 921,372 | Divine | May 11, 1909 |
| 2,351,795 | Wood | June 7, 1944 |
| 2,622,020 | Morrison | Dec. 16, 1952 |

FOREIGN PATENTS

| | | |
|---|---|---|
| 10,915 | Great Britain | 1900 |
| 494,296 | Canada | July 7, 1953 |